United States Patent
Huuva et al.

(10) Patent No.: US 10,304,594 B2
(45) Date of Patent: May 28, 2019

(54) METHOD FOR PROVIDING AN INSULATED ELECTRIC CABLE OR DC TERMINATION OR JOINT

(71) Applicant: NEXANS, Paris (FR)

(72) Inventors: Ramona Huuva, Torslanda (SE); Lars Lervik, Halden (NO); Liv Lundegaard, Fredrikstad (NO)

(73) Assignee: NEXANS, Courbevoie (FR)

( * ) Notice: Subject to any disclaimer, the term of this patent is extended or adjusted under 35 U.S.C. 154(b) by 252 days.

(21) Appl. No.: 15/509,564

(22) PCT Filed: Sep. 8, 2015

(86) PCT No.: PCT/EP2015/070478
§ 371 (c)(1),
(2) Date: Mar. 8, 2017

(87) PCT Pub. No.: WO2016/038024
PCT Pub. Date: Mar. 17, 2016

(65) Prior Publication Data
US 2017/0263354 A1 Sep. 14, 2017

(30) Foreign Application Priority Data
Sep. 8, 2014 (EP) .................................. 14306378

(51) Int. Cl.
*H01B 13/14* (2006.01)
*H01B 13/06* (2006.01)
(Continued)

(52) U.S. Cl.
CPC ....... *H01B 13/145* (2013.01); *H01B 13/0016* (2013.01); *H02G 1/14* (2013.01)

(58) Field of Classification Search
CPC .................................................. H01B 13/145
See application file for complete search history.

(56) References Cited

U.S. PATENT DOCUMENTS

| 8,398,803 B2 * | 3/2013 | Olsson | ................... | H01B 3/441 156/242 |
| 2002/0039654 A1 | 4/2002 | Gustafsson et al. | | |
| 2010/0314022 A1 | 12/2010 | Olsson | | |

FOREIGN PATENT DOCUMENTS

| CN | 101944406 | 1/2011 |
| JP | 2000215741 | 8/2000 |

(Continued)

OTHER PUBLICATIONS

Notification of Provisional Refusal dated Sep. 4, 2018.
International Search Report dated Oct. 12, 2015.

*Primary Examiner* — Jeffry H Aftergut
(74) *Attorney, Agent, or Firm* — Sofer & Haroun, LLP

(57) ABSTRACT

The invention is related to a method of providing an insulated electric DC cable or DC termination or joint, the method comprising:—providing a polymer based insulation system (11,12,13) comprising a compounded polymer composition (12), characterized by the step of:—exposing the polymer based insulation system (11,12,13) to a heat treatment procedure while the outer surface of the polymer based insulation system (11,12,13) is covered by a cover (14) permeable to all the substances present in the polymer based insulation system (11,12,13) in a non-homogenous distribution, the permeable cover (14) having a melting and/or softening temperature greater than or equal to 120° C., thereby equalizing the concentration of the substances in the polymer based insulation system (11,12,13), the cable comprising a multi-wire conductor (10) that includes a central circular wire (101) that is surrounded by several layers of adjacent quadrangular wires (102).

16 Claims, 2 Drawing Sheets

(51) Int. Cl.
*H01B 13/00* (2006.01)
*H02G 1/14* (2006.01)

(56) References Cited

FOREIGN PATENT DOCUMENTS

| JP | 2008041510 | 2/2008 |
| WO | 2009/103630 | 8/2009 |
| WO | 20140117841 | 8/2014 |

* cited by examiner

METHOD FOR PROVIDING AN INSULATED ELECTRIC CABLE OR DC TERMINATION OR JOINT

RELATED APPLICATION

This application is a National Phase of PCT/EP2015/070478, filed on Sep. 8, 2015 which in turn claims the benefit of priority from European Patent Application No. 14-306-378.2, filed on Sep. 8, 2014, the entirety of which are incorporated by reference.

BACKGROUND

Field of the Invention

The present invention relates generally to electrical power equipment, and particularly to high voltage electrical power equipment. More particularly, the invention relates to a method for providing an insulated electric high voltage DC cable or a high voltage DC termination or joint.

Description of Related Art

Extruded solid insulation based on a polyethylene, or a cross linked polyethylene (XLPE), has for almost 40 years been used for AC transmission and distribution cable insulation.

Therefore the possibility of the use of XLPE for DC cable insulation has been under investigation for many years. Cables with such insulations have the same advantage as the mass impregnated cable in that for DC transmission there are no restrictions on circuit length and they also have a potential for being operated at higher temperatures, thus offering a possibility to increase the transmission load.

However, it has not been possible to obtain the full potential of these materials for full size cables. It is believed that one of the main reasons being the development and accumulation of space charges in the dielectric when subjected to a DC field. Such space charges distort the stress distribution and persist for long periods because of the high resistivity of the polymers. Space charges in an insulation body do, when subjected to the forces of an electric DC-field, accumulate in a way that a polarized pattern similar to a capacitor is formed.

There are two basic types of space charge accumulation patterns, differing in the polarity of the space charge accumulation. The space charge accumulation results in a local increase at certain points of the actual electric field in relation to the field, which would be contemplated when considering the geometrical dimensions and dielectric characteristics of insulation. The increase noted in the actual field might be 5 or even 10 times the contemplated field.

Thus, the design field for cable insulation must include a safety factor taking account for this considerably higher field resulting in the use of thicker and/or more expensive materials in the cable insulation. The build up of the space charge accumulation is a slow process, and therefore this problem is accentuated when the polarity of the cable after being operated for a long period of time at same polarity is reversed. As a result of the reversal a capacitive field is superimposed on the field resulting from the space charge accumulation and the point of maximal field stress is moved from the interface and into the insulation. Attempts have been made to improve the situation by the use of additives to reduce the insulation resistance without seriously affecting other properties.

An extruded resin composition for AC cable insulation typically comprises a polyethylene resin as the base polymer complemented with various additives such as a peroxide cross linking agent, a scorch retarding agent and an anti-oxidant or a system of antioxidants. In the case of an extruded insulation the semi-conductive shields are also typically extruded and comprise a resin composition that in addition to the base polymer and an electrically conductive or semi-conductive filler comprises essentially the same type of additives. The various extruded layers in an insulated cable in general are often based on a polyethylene resin. Polyethylene resin means generally and in this application a resin based on polyethylene or a copolymer of ethylene, wherein the ethylene monomer constitutes a major part of the mass.

Thus polyethylene resins may be composed of ethylene and one or more monomers which are co-polymerisable with ethylene. Low density polyethylene (LDPE) is today the predominant insulating base material for AC cables. To improve the physical properties of the extruded insulation and its capability to withstand degradation and decomposition under the influence of the conditions prevailing under production, shipment, laying, and use of such a cable the polyethylene based composition typically comprises additives such as stabilizing additives, e.g. antioxidants, electron scavengers to counteract decomposition due to oxidation, radiation etc., lubricating additives, e.g. stearic acid, to increase processability, additives for increased capability to withstand electrical stress, e.g. an increased water tree resistance, e.g. polyethylene glycol, silicones etc., and cross-linking agents such as peroxides, which decompose upon heating into free radicals and initiate cross-linking of the polyethylene resin, sometimes used in combination with unsaturated compounds having the ability to enhance the cross-linking density, scorch retarders to avoid premature cross-linking.

The number of various additives is large and the possible combinations thereof are essentially unlimited. When selecting an additive or a combination or group of additives the aim is that one or more properties shall be improved while others shall be maintained or if possible also improved. However, in reality it is always next to impossible to forecast all possible side effects of a change in the system of additives. In other cases the improvements sought for are of such dignity that some minor negative have to be accepted, although there is always an aim to minimize such negative effects.

It is well known that the type of XLPE composition exhibits a strong tendency to form space charges under DC electric fields, thus making it unusable in insulation systems for DC cables. However, it is also known that extended degassing, i.e., exposing the cross linked cable insulation to high temperatures for long periods of time, will result in a decreased tendency to space charge accumulation under DC voltage stress. It is generally believed that the heat treatment removes the peroxide decomposition products, such as acetophenone and cumyl alcohol, from the insulation whereby the space charge accumulation is reduced. Most known cross-linked polyethylene compositions used as extruded insulation in AC-cable exhibit a tendency for space charge accumulation which renders them unsuitable for use in insulation systems for DC cables.

OBJECTS AND SUMMARY

Thus it is desirous to provide a process for production of an insulated DC cable with an extruded polymer based electrical insulation system suitable for use as a transmission and distribution cable in networks and installations for DC transmission and distribution of electric power. The process for application and processing of then extruded insulation system shall preferably be carried out in a manner such that there is no need for any lengthy time consuming batch-treatment. (e.g. heat treatment) of the cable to ensure stable and consistent dielectric properties and a high and consistent electric strength of the cable insulation. The resulting cable insulation shall further exhibit a low tendency to space charge accumulation, a high DC breakdown strength, a high impulse strength and high insulation resistance. The adoption of such a process would offer both technical and economical advances over prior art methods as production time and production costs can be reduced and the possibility for an essentially continuous or at least semi-continuous process for the application and processing of the cable insulation system is provided. Further the process shall ensure that the reliability, the low maintenance requirements and the long working life of a conventional DC-cable, comprising an impregnated paper-based insulation, shall be maintained or improved.

It is an object of the present invention to provide a method for providing an insulated electric (high voltage) DC cable as specified in the foregoing. It is also an object of the invention to provide a (high voltage) DC termination or joint having similar properties.

The object mentioned above is accomplished by a method of providing an insulated electric DC cable or DC termination or joint.

The method according to the invention comprises:

providing a polymer based insulation system comprising a compounded polymer composition, characterized by the step of:

exposing the polymer based insulation system to a heat treatment procedure while the outer surface of the polymer based insulation system is covered by a cover permeable to all the substances present in the polymer based insulation system in a non-homogenous distribution, the permeable cover having a melting and/or softening temperature greater than or equal to 120° C., and preferably greater than or equal to 125° C., thereby equalizing the concentration of the substances in the polymer based insulation system, the cable comprising a multi-wire conductor that includes a central circular wire that is surrounded by several layers of adjacent quadrangular wires.

Indeed, the applicant has surprisingly discovered that contrarily to the use of an impermeable cover disclosed in U.S. Pat. No. 8,398,803, a low tendency to space charge accumulation could also be obtained with the use of a specific permeable cover, that slows down permeation and leads to a more even distribution on the volatile by-products through the polymer based insulation system. It has been discovered that the same effect on the final by-product distribution as an impermeable layer can be obtained with the permeable cover.

The quadrangular wires can be rectangular or quasi-rectangular. For instance, the quadrangular wires can comprise a lower circular-arc side, an upper circular-arc side and two lateral rectilinear sides.

The gaps between the rectangular wires are advantageously filled with a watertight material.

The permeability of the permeable cover to the substances is preferably lower than the permeability of the polymer based insulation system (typically the compounded polymer composition) to the substances.

The permeable cover can comprise a polymeric material that is chosen from, but not limited to: polyolefins, i.e. homopolymers and copolymers, such as high density polyethylene and polypropylene, polyacetates, polystyrenes, polyacrylates, such as polymethylmethacrylates, halogenated polymers, such as polytetrafluoroethylene and polyvinyl chloride, polycarbonates, polyesters, such as polyethylene terephthalate, polyamides, such as polyamide 6 (nylon), polyoximetylen, polysulfons, and polyaryleterketons.

The compounded polymer composition is preferably a cross-linked polymer composition.

The compounded polymer composition is typically a cross-linked polyethylene.

The substances present in the polymer based insulation system in a non-homogenous distribution include typically at least one rest or byproduct from the cross-linking.

The substances present in the polymer based insulation system in a non-homogenous distribution can include at least one peroxide decomposition product.

The polymer based insulation system can comprise a first semi-conducting shield, the compounded polymer composition, and a second semi-conducting shield.

The permeable cover is preferably removed after the heat treatment procedure.

The method can be a method for production of insulated electric DC cable and:

the cable can be exposed to a heat treatment while the outer surface of the polymer based insulation system is preferably not covered by the permeable cover to remove a second substance present in the polymer based insulation system after cross-linking; and said exposure of the polymer based insulation system to the heat treatment procedure while the outer surface of the extruded polymer based insulation system is covered by the cover is preferably performed after removal of said second substance to thereby equalize the concentration of the substances in the polymer based insulation system.

Said second substance is typically methane.

Said exposure of the polymer based insulation system to the heat treatment procedure while the outer surface of the extruded polymer based insulation system is preferably covered by the cover is performed after removal of said second substance to thereby increase the concentration of the substances adjacent to the outer surface of the polymer based insulation system.

The heat treatment procedure can be performed at a temperature of between 50 and 120° C., and most preferably between 85 and 105° C.

Further characteristics of the invention and advantages thereof will be evident from the following detailed description of embodiments of the invention:

DETAILED DESCRIPTION

Figures 1, 2:
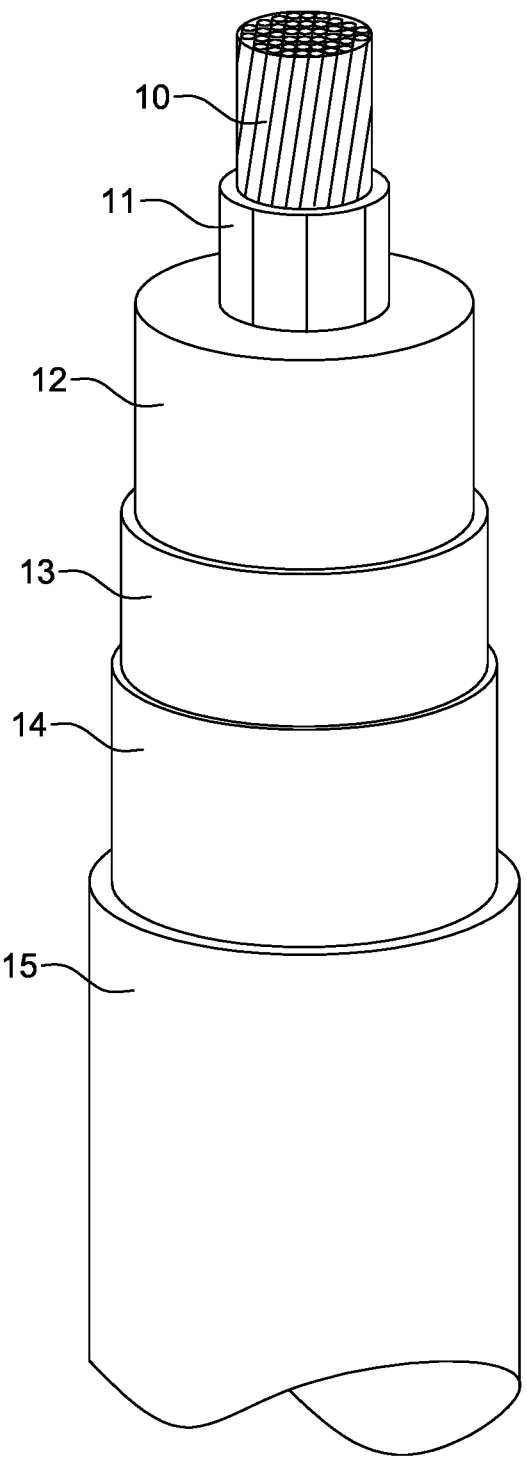
FIG. 1 is a flow scheme of a method for production of an insulated electric high voltage DC cable according to an embodiment of the present invention.
FIG. 2 illustrates schematically in a perspective view a high voltage DC cable as manufactured according to the flow scheme of FIG. 1.

A method for production of an insulated electric high voltage DC cable according to an embodiment of the present invention will now be described with reference to FIGS. 1 and 2. The latter Figure shows the insulated electric high voltage DC cable in a section view. The DC cable comprises from the center and outwards: a stranded multi-wire conductor 10, a first extruded semi-conducting shield 11 disposed around and outside the conductor 10, an extruded polyethylene based conductor insulation 12 with an extruded, cross-linked composition as further described below, a second extruded semi-conducting shield 13 disposed outside the conductor insulation 12, and an outer covering or sheath 15 arranged outside the polymer based insulation system.

Figure 3:
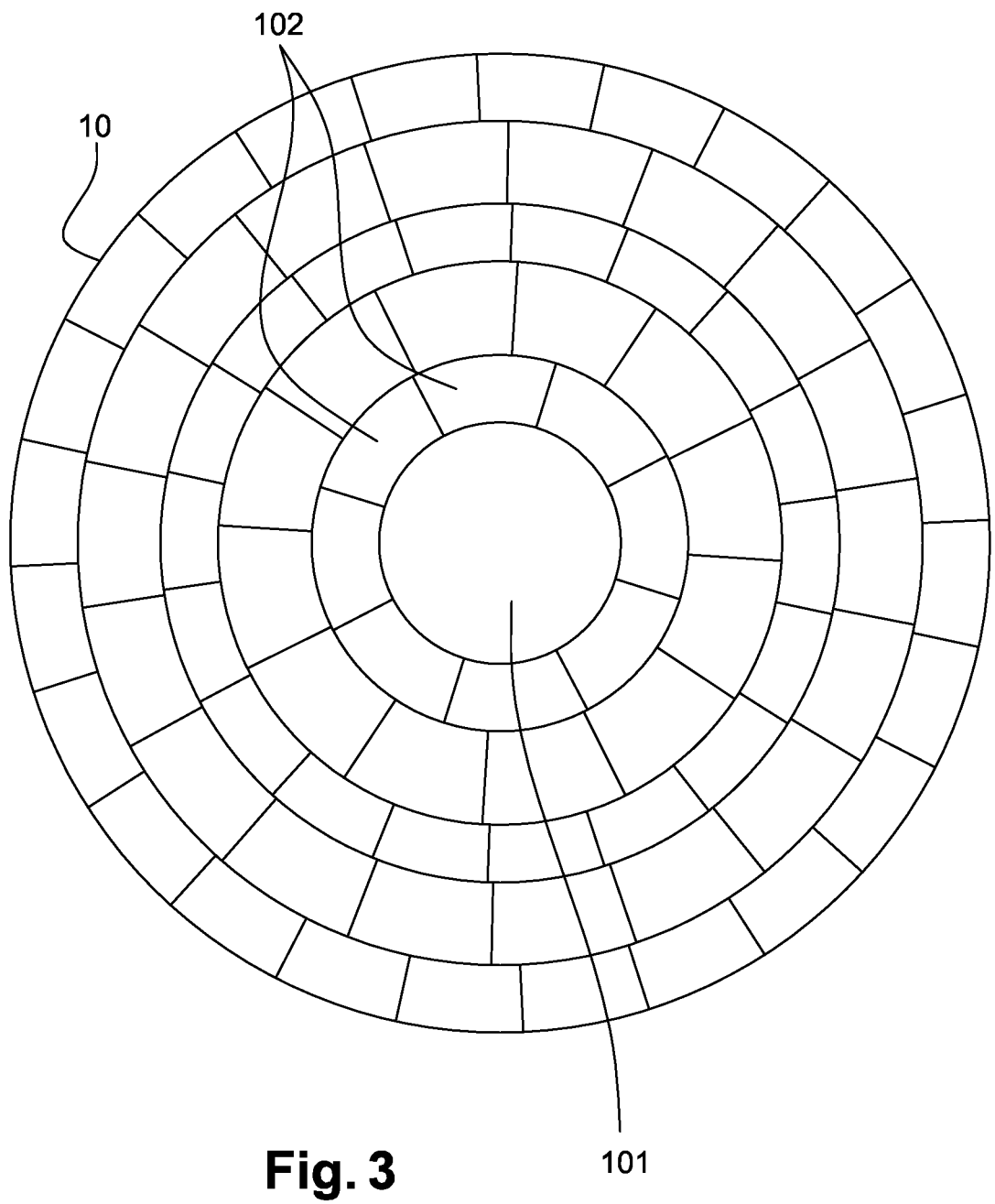
FIG. 3 is a cross sectional view of the conductor of the high voltage DC cable.

As shown in FIG. 3, the multi-wire conductor 10 comprises, in cross-section, a central circular wire 101 that is surrounded by several concentric layers of adjacent quadrangular wires 102. Every layer of adjacent quadrangular wires 102 forms a ring. The quasi-rectangular wires 102 can comprise a lower circular-arc side, an upper circular-arc side and two lateral rectilinear sides. In each layer, two adjacent wires 102 are in contact via a lateral rectilinear side of each adjacent wire 102. For two adjacent layers, two adjacent wires 102 are in contact via a circular-arc side of each adjacent wire 102.

This profiled conductor 10 provides an efficient and compact design. Compared to a conductor comprising circular shaped wires, the profiled conductor 10 has smaller gaps between the wires 102 and thus has a better watertightness. Furthermore, a lower amount of an gap-filing compound is needed.

The DC cable can when found appropriate be further complemented in various ways with various functional layers or other features. It can for example be complemented with a reinforcement in form of metallic wires outside the outer extruded shield 13, a sealing compound or a water swelling powder introduced in metal/polymer interfaces or a system achieved by e.g. a corrosion resistant metal polyethylene laminate and longitudinal water sealing achieved by water swelling material, e.g. tape or powder beneath the sheath 15. The conductor need not be stranded but can be of any desired shape and constitution, such as a stranded multi-wire conductor, a solid conductor or a segmental conductor.

According to the method for production of the insulated electric high voltage DC cable, a polymer based insulation system is, in a step 21, extruded around the conductor 10, wherein the polymer based insulation system comprises the semi-conducting shield 11, the polyethylene based conductor insulation 12, and the second semi-conducting shield 13. In an alternative embodiment the polyethylene based conductor insulation 12 is exchanged for other polymer based conductor insulation.

Below is a short description of one exemplary method of performing the extrusion. A person skilled in the art realizes that there are other extrusion techniques that can be used with the present invention.

In the exemplary method the conductor is fed from a conductor pay-off through the extruder equipment and other processing and conditioning devices and is finally taken up on a cable core take-up. The conductor pay-off and cable core take-up may be reels or drums suitable for discrete lengths but can be of any suitable type including devices for essentially continuous handling of the supplied conductor and produced cable. The conductor is passed over a first wheel through a conductor preheater wherein it is preheated for a suitable temperature before the insulation system is applied by extrusion. The process is suitable for true triple extrusion where a triple head extruder is used. The inner and outer semi-conductive layers are applied using two separate extruders and a further third extruder is used for the main insulation.

After the extrusion operation the extruded polyethylene based conductor insulation 12 is advantageously, in a step 22, cross-linked. To this end the insulated DC cable is passed through a pressurized curing and cooling chamber, wherein the conditions is controlled to ensure the desired cross-linking degree and other structural characteristics that can be effected by this controlled conditioning and cooling of the extruded insulation system. Typically, the extruded polyethylene based conductor insulation 12 includes a number of additives, among them dicumylperoxide and additives. Thereafter the cable is hauled through a haul-off caterpillar and over a second wheel before being taken up for further processing.

The above approach offers the possibility of an essentially continuous or semi-continuous process for the application and processing of the extruded insulation system.

As a result of the process, however, methane may be created in the cross-linked polyethylene based conductor insulation 12. Any methane may be removed by exposing, in a step 23, the extruded DC cable to a heat treatment while the outer surface of the extruded polymer based insulation system is kept free from any covering to thereby allow the methane to leave.

Next, in a step 24, the outer surface of the extruded polymer based insulation system is covered by a cover 14 permeable to all the substances present in the extruded insulation system in a non-homogenous distribution, for instance a cover of polytetrafluoroethylene.

The substances include preferably one or more rest or byproducts from the cross-linking and/or one or more additives. The rest products include typically peroxide decomposition products, such as acetophenone and cumyl alcohol, and the additives include typically one or more antioxidants and scorch retarders. However, other additives may be of equal or even higher importance.

Next, after having covered the extruded DC cable with the permeable cover, the extruded DC cable is, in a step 25, exposed for a heat treatment procedure in order to equalize the concentration of the substances in the extruded insulation system, in particular adjacent to the outer surface of the extruded insulation system. In particular, since the first heat treatment for removal of methane typically causes the concentration profile to shift from a parabolic shape to a monotonously decreasing concentration profile as seen from an inner surface of the extruded insulation system, the second heat treatment with the permeable cover causes the concentration of the one or more substances to increase adjacent to the outer surface of the extruded insulation system.

This heat treatment procedure may be performed depending on the particular applications and on the particular cross linking additives used. However, temperature and treatment times which typically are used for the common additives used today are indicated below.

The heat treatment procedure is preferably performed at a temperature of between 50 and 120° C., and more preferably between 85 and 105° C. If the heat treatment is performed on the entire cable, in a two-step degassing procedure, the temperature is preferably of about 70° C. in order to prevent cable deformation, and the heat time is preferably at least a couple of weeks.

Finally, the permeable cover 14 is removed and the outer covering or sheath 15 is provided.

The invention claimed is:

1. A method of providing an insulated electric DC cable or DC termination or joint, the method comprising:
    providing a polymer based insulation system around a multi-wire conductor, said insulation system comprising a compounded polymer composition, wherein said method further comprises the steps of:
    exposing the conductor with the polymer based insulation system to a heat treatment procedure while the outer surface of the polymer based insulation system is covered by a cover permeable to all the substances present in the polymer based insulation system, the temperature and duration of the heat treatment being defined so as to achieve equalizing the concentration of the substances in the polymer based insulation system,
    removing the permeable cover and providing an outer covering sheath on the outer surface of the polymer based insulation system;
    the multi-wire conductor comprising a central circular wire that is surrounded by several layers of adjacent quadrangular wires.

2. The method according to claim 1, wherein the quadrangular wires comprise a lower circular-arc side, an upper circular-arc side and two lateral rectilinear sides.

3. The method according to claim 1, wherein the gaps between the quadrangular wires are filled with a watertight material.

4. The method according to claim 1, wherein, the permeable cover has a melting and/or softening temperature greater than or equal to 120° C.

5. The method according to claim 1, wherein the permeability of the permeable cover to the substances is lower than the permeability of the polymer based insulation system to the substances.

6. The method according to claim 1, wherein the permeable cover comprises a polymeric material that is chosen from polyolefins, polyacetates, polystyrenes, polyacrylates, halogenated polymers, polycarbonates, polyesters, polyamides, polyoximetylen, polysulfons, and polyaryleterketons.

7. The method according to claim 1, wherein the compounded polymer composition is a cross-linked polymer composition.

8. The method according to any of claim 1, wherein the compounded polymer composition is a cross-linked polyethylene.

9. The method according to claim 1, wherein the substances present in the polymer based insulation system in a non-homogenous distribution include at least one rest or byproduct from the cross-linking.

10. The method according to claim 9, wherein the substances present in the polymer based insulation system in a non-homogenous distribution include at least one peroxide decomposition product.

11. The method according to claim 1, wherein the polymer based insulation system comprises a first semi-conducting shield, the compounded polymer composition, and a second semi-conducting shield.

12. The method according to claim 1, wherein the permeable cover is removed after the heat treatment procedure.

13. The method according to claim 1, wherein the method is a method for production of insulated electric DC cable and that:
    the cable is exposed to a heat treatment while the outer surface of the polymer based insulation system is not covered by the permeable cover to remove a second substance present in the polymer based insulation system after cross-linking; and
    said exposure of the polymer based insulation system to the heat treatment procedure while the outer surface of the extruded polymer based insulation system is covered by the cover is performed after removal of said second substance to thereby equalize the concentration of the substances in the polymer based insulation system.

14. The method according to claim 13, wherein said second substance is methane.

15. The method according to claim 13, wherein said exposure of the polymer based insulation system to the heat treatment procedure while the outer surface of the extruded polymer based insulation system is covered by the cover is performed after removal of said second substance to thereby increase the concentration of the substances adjacent to the outer surface of the polymer based insulation system.

16. The method according to claim 1, wherein the heat treatment procedure is performed at a temperature of between 50 and 120° C.

* * * * *